Figure 1:
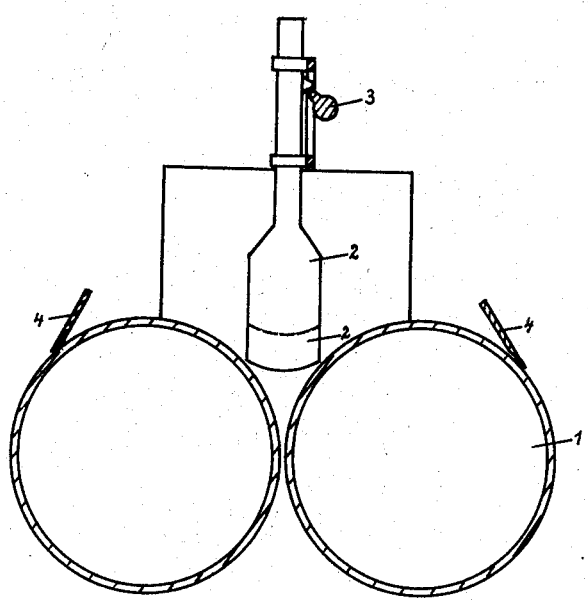

Sept. 12, 1939.　　　　　M. COHN　　　　　2,172,699
PROCESS OF TREATING SEEDS FOR THE PRODUCTION OF FOOD
Filed Sept. 17, 1934

Patented Sept. 12, 1939

2,172,699

UNITED STATES PATENT OFFICE 2,172,699

PROCESS OF TREATING SEEDS FOR THE PRODUCTION OF FOOD

Martin Cohn, Berlin-Friedenau, Germany

Application September 17, 1934, Serial No. 744,452
In Germany September 22, 1933

5 Claims. (Cl. 99—98)

The invention relates to the treatment of seeds containing substantial proportions of oil or fat, such as soya beans, earth nuts, copra, cotton seeds, palm kernels, sesame, walnuts, hazel nuts and so on, for the production of human or animal food.

Various known processes of treating grains and seeds include a wet treatment, or steam treatment, by which the grains or seeds are caused to swell. It has been found that a rapid drying is then frequently important or essential. This rapid drying of swelled grains and seeds has been found to present considerable difficulties, very marked in the case of seeds containing oil or fat. Hot revolving cylinders, to which the material has been fed to be passed between them, fail to adequately grip the material and to carry it through the gap, so that it either does not go through at all or lies on the cylinders too long and is scorched. The flaking of seeds containing oil or fat was impossible till now. The grinding of flakes to flour also presents considerable difficulties, especially, if oil or fat is in the material.

According to this invention these difficulties are overcome by using for the drying of the swelled seeds in conjunction with the hot cylinders, mechanism by which the material is pressed or forced into the gap between the same, for example, a thrusting mechanism such as a battery of rams. The material is thus dried and converted into flakes, which may subsequently be ground, if a flour is desired as the final product.

The step of swelling the seeds may be used simultaneously for improving them in some respect, for example, for removal of bitterness of flavor in the case of soya beans.

It is necessary to feed the goods to the cylinders in a swelled state. If the goods withstand it, the swelling may be produced by treatment with steam. In the case of soya beans a water content of about 50% or more is advantageous. By reason of the presence of the water which produced the swelling, and by the pressing or ramming action, the goods are well gripped by the heated cylinders, whereas otherwise they would lie on the cylinders and be scorched, as has always been observed when the goods contained oil or fat.

For swelling the seeds water is used or, if the removal of bitterness or an improvement of the material is intended, water with an addition of an acid or an alkali is used. The addition may be neutralized afterwards. Also water with an addition of a salt may be used.

During or after the treatment with water or solution for swelling purposes the goods may receive additions, for example, soluble or emulsified building-up substances, nutrients or flavoring substances such as sugar, cocoa and so on, or medicaments. The following additions may also be mentioned: phosphoric acid, lime and iron compounds.

In order to accelerate the swelling and to work with practically no waste the swelling is performed at raised temperatures up to about 45° C.

In treating soya beans and other seeds containing oil or fat the removal of bitterness is necessary. The wet treatment for removal of bitterness is as follows. The whole soya beans are first soaked in water containing about 0.1% of hydrochloric acid, or some other acid, and then further soaked for about 30 minutes at about 65° C., with slight agitation, and after neutralizing the acid are separated from the liquid and washed.

The swelled beans are then transferred to a cylinder drier with a device which presses the material into the gap between the cylinders. A steam-heated two-cylinder drier with ram apparatus may be used with advantage.

An apparatus of this kind is shown in the annexed drawing, in which

Figure 2:
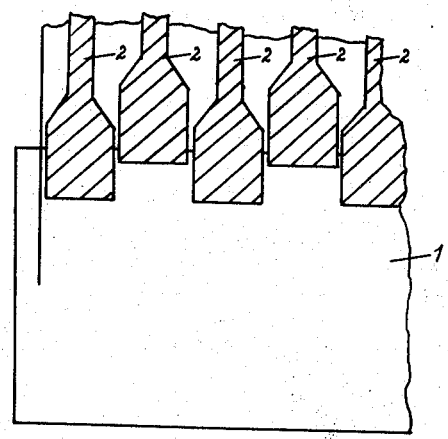

Fig. 1 is a cross-section thereof, and
Fig. 2 a partial longitudinal section.

Above the gap between the two cylinders 1 there is a bank of rams 2 actuated by a cam shaft 3. Knives 4 scrape the material off the cylinders in the form of flakes.

The flakes can be produced with any desired moisture content. The moisture of the goods can be reduced, for instance, to 8% and lower, for instance, to about 2%.

As the cylinders squeeze or crush the goods, in addition to drying them, a treatment for changing the flavor in some particular way, as is desirable in the case of soya beans, may be incorporated with the operation, by effecting appropriate heating directly following the drying. In the case of steam heated cylinders it is for this purpose only necessary to regulate the supply of steam and the circumferential velocity of the cylinders. The goods first change into thin, dry skin-like flakes, and are then subjected to the heating for imparting a particular flavor, for example, biscuit flavor in the case of soya beans. In this way the change of flavor can be effected very quickly.

Sometimes for certain purposes flours or flakes with low fat content are desired. In this case the fat containing flakes are pressed, so that the fat or oil flows off, or are treated with fat solvents. Then the press cake is broken or, if desired, ground to flour.

The following is an example of the manner of carrying out the process.

Unshelled soya beans are soaked for a short time, say about 30 minutes, in about their own weight of water containing about 0.1% of hydrochloric acid at about 45° C., and are then treated with the liquid at 65° C. for about 30 minutes, with slight agitation. When the liquid has been separated the swelled beans are washed with water and then transferred to the drier. Before washing, and if desired before completion of the hot wet treatment an addition of sodium carbonate may be made to neutralize the acid or create an excess of salts.

The flakes coming from the drier are entirely neutral to the taste unless by heating them after the drying a particular flavor has been imparted.

My invention is of great importance for grains and seeds overaged or otherwise damaged.

For instance, grains overaged or otherwise damaged are placed for a short time in warm water, after washing away the dirt. If necessary an acid, alkali, or salt or a mixture thereof, may be added to remove damaged parts. In the case of moldy grain an addition of sodium chloride is sufficient. After adequate swelling and removal of flavor the water is drained off and the goods are washed and transferred to the drier.

Commonly overaged grain treated by some reconditioning process such as roasting, has an unpleasant flavor, partly arising from the treatment.

By the treatment according to the invention the cells of the husks are opened up, so that it is unnecessary to remove the husks and a yield of nearly 100% can be obtained.

If the seeds require no improvement, such as the removal of bitter flavor or the like, it is sufficient to let them absorb only enough water or solution to enable the drying cylinders to grip them.

For the production of flour, the grinding of the flakes, especially the flakes with fat content, presents great difficulties. According to the invention there are overcome by grinding the flakes to flour in cross beater mills, centrifugal mills or the like, or in rapidly rotating mills, especially in the Novoplex-machine. Thereby, if desired, a flour with a particular taste and color can be produced from flakes having a neutral taste. For that purpose the air blower, which is necessary because of the high speed of turning of such machines, is throttled or the sucker is regulated correspondingly. The goods are thereby exposed to a raised temperature in the mill during the grinding. By regulating the quantity, which enters into the mill, structures of different kinds can be produced. This can also be done by appropriate choice of the size of the hole or slit of the grate plates or grates.

If a sifting of the ground material is desired centrifugal sifters, cylinders and the like are unfit, that is partly useless, because fat containing materials hinder or make impossible the sifting to flour. According to the invention for the sifting round plan sifters are used, in which the goods are mechanically moved, for example, round plan sifters which have a parallel crank motion and do not require other means for moving the material.

The treatment described yields products having the following advantages as flour or as flakes. High capacity of swelling; large volume; almost unlimited durability; opened cells; oil content not liable to become rancid, and retardation of souring.

It is, furthermore, important that the process can be used for all seeds mentioned without a change of the process and always supplies high grade food and fodder products only by simple wet treatment and passage of the goods through the mentioned cylinder drier.

It was heretofore known to subject grains to rolling after dextrination by boiling. In addition to the boiling treatment which produces sticky constituents, the material was comminuted or the rollers were provided at the gap with a sticky mass, and only thick flattened pieces were made by the rolling.

In my Patent No. 2,144,911, dated January 24, 1939, I have claimed the apparatus for carrying out the drying and filming of the material.

I claim:

1. The process of treating seeds containing substantial quantities of oil or fat for the production of human or animal food, comprising swelling raw seeds in whole condition by soaking with water, pressing the raw, whole seeds into extremely thin skin-like films by forcing them under pressure through a very narrow gap between heated, revolving surfaces and retaining the films in contact with one of the heated surfaces until dry.

2. The process of treating seeds containing substantial quantities of oil or fat for the production of human or animal food, comprising swelling raw seeds in whole condition by soaking with water, pressing the raw, whole seeds into extremely thin skin-like films by forcing them under pressure through a very narrow gap between heated revolving surfaces and retaining the films in contact with one of the heated surfaces until dry, removing the oil or fat from the dried material and grinding the product into flour.

3. The process of treating soya beans which contain a substantial amount of oil or fat to produce human or animal food in the form of extremely thin, skin-like dry films, without bitter taste, comprising soaking raw, whole soya beans in acidulated water to swell the seeds and remove the bitter flavor of the beans, pressing the raw, whole seeds into extremely thin, skin-like films by forcing them under pressure through a very narrow gap between heated revolving surfaces and retaining the films in contact with one of the heated surfaces until dry.

4. Process of treating whole, unshelled soya beans which have a bitter taste and which contain a substantial amount of oil or fat to produce human or animal food in the form of extremely thin, skin-like, dry films, without bitter taste, comprising, soaking the raw, whole unshelled beans in acidulated water at a temperature of about 45° C., then agitating the beans in the acidulated water for about 30 minutes at a temperature of about 65° C. to swell the beans and remove the bitter taste, then neutralizing and washing the beans, and pressing the whole beans through a very narrow gap between heated revolving surfaces at sufficiently high temperature to dry the beans to form the beans into extremely thin, skin-like, dry films free of bitter taste.

5. The process of treating seeds containing substantial proportions of oil or fat for the production of human or animal food in the form of thin films, comprising swelling raw seeds in whole condition by soaking with water, pressing the whole seeds into extremely thin, skin-like films by forcing them under pressure through a very narrow gap between heated revolving surfaces and retaining the films in contact with one of the heated surfaces until dry, and for a sufficiently long period to alter the flavor of the films by the heat.

MARTIN COHN.